(12) United States Patent
Raikin et al.

(10) Patent No.: US 11,321,092 B1
(45) Date of Patent: May 3, 2022

(54) TENSOR-BASED MEMORY ACCESS

(71) Applicant: Habana Labs Ltd., Caesarea (IL)

(72) Inventors: Shlomo Raikin, Moshav Ofer (IL); Sergei Gofman, Haifa (IL); Ran Halutz, Ramat HaSharon (IL); Evgeny Spektor, Kfar Yona (IL); Amos Goldman, Pardes Hanna-Karkur (IL); Ron Shalev, Pardes Hana-Karkur (IL)

(73) Assignee: HABANA LABS LTD., Caesarea (IL)

( * ) Notice: Subject to any disclaimer, the term of this patent is extended or adjusted under 35 U.S.C. 154(b) by 111 days.

(21) Appl. No.: 16/170,069

(22) Filed: Oct. 25, 2018

Related U.S. Application Data (60) Provisional application No. 62/582,990, filed on Nov. 8, 2017.

(51) Int. Cl.
*G06F 15/00* (2006.01)
*G06F 9/30* (2018.01)

(52) U.S. Cl.
CPC ........ *G06F 9/30145* (2013.01); *G06F 9/3001* (2013.01); *G06F 9/3004* (2013.01); *G06F 9/30036* (2013.01); *G06F 9/30174* (2013.01); *G06F 9/30196* (2013.01)

(58) Field of Classification Search
CPC ............... G06F 9/30145; G06F 9/3001; G06F 9/30036; G06F 9/3004; G06F 9/30174; G06F 9/30196
USPC .......................................................... 712/209
See application file for complete search history.

(56) References Cited

U.S. PATENT DOCUMENTS

| | | | |
|---|---|---|---|
| 4,760,518 A * | 7/1988 | Potash | G06F 9/3885 708/441 |
| 5,099,447 A | 3/1992 | Myszewski | |
| 5,226,171 A | 7/1993 | Hall et al. | |
| 5,471,627 A | 11/1995 | Means et al. | |
| 6,675,187 B1 | 1/2004 | Greenberger | |
| 7,543,119 B2 | 6/2009 | Hessel et al. | |
| 9,262,165 B2 | 2/2016 | Hatano et al. | |
| 9,647,667 B1 | 5/2017 | Perry | |
| 9,946,539 B1 * | 4/2018 | Temam | G06F 17/16 |
| 10,387,122 B1 | 8/2019 | Olsen | |
| 10,685,082 B2 | 6/2020 | Bekas et al. | |
| 2003/0225805 A1 | 12/2003 | Nash | |

(Continued)

FOREIGN PATENT DOCUMENTS

EP 0517241 A2 12/1992

OTHER PUBLICATIONS

Shalev et al., U.S. Appl. No. 15/700,213, filed Sep. 11, 2017.

(Continued)

*Primary Examiner* — Chun Kuan Lee
(74) *Attorney, Agent, or Firm* — Kligler & Associates Patent Attorneys Ltd (57) ABSTRACT

A processor includes an internal memory and processing circuitry. The internal memory is configured to store a definition of a multi-dimensional array stored in an external memory, and indices that specify elements of the multi-dimensional array in terms of multi-dimensional coordinates of the elements within the array. The processing circuitry is configured to execute instructions in accordance with an Instruction Set Architecture (ISA) defined for the processor. At least some of the instructions in the ISA access the multi-dimensional array by operating on the multi-dimensional coordinates specified in the indices.

22 Claims, 4 Drawing Sheets

(56) References Cited

U.S. PATENT DOCUMENTS

| | | | |
|---|---|---|---|
| 2006/0095258 | A1 | 5/2006 | Jeong et al. |
| 2007/0143574 | A1 | 6/2007 | Bonebakker et al. |
| 2008/0052693 | A1* | 2/2008 | Archambault .......... G06F 8/443 717/151 |
| 2011/0307459 | A1* | 12/2011 | Jacob (Yaakov) ........ G06T 1/60 707/705 |
| 2014/0181171 | A1 | 6/2014 | Dourbal |
| 2015/0269122 | A1 | 9/2015 | Lang |
| 2017/0004089 | A1* | 1/2017 | Clemons ............ G06F 12/0893 |
| 2017/0147531 | A1 | 5/2017 | Bekas et al. |
| 2017/0255572 | A1* | 9/2017 | Rohe .................. G06F 12/1483 |
| 2017/0344514 | A1 | 11/2017 | Zhou |
| 2018/0074962 | A1* | 3/2018 | Giefers .............. G06F 9/30043 |
| 2018/0074996 | A1 | 3/2018 | Ling et al. |
| 2018/0336163 | A1 | 11/2018 | Phelps et al. |
| 2018/0365561 | A1* | 12/2018 | Temam .................... G06N 3/08 |
| 2019/0012295 | A1 | 1/2019 | Yinger et al. |
| 2019/0303743 | A1 | 10/2019 | Venkataramani et al. |

OTHER PUBLICATIONS

Shalev et al., U.S. Appl. No. 15/700,207, filed Sep. 11, 2017.
Halutz et al., U.S. Appl. No. 16/186,620, filed Nov. 12, 2018.
Shalev et al., U.S. Appl. No. 16/136,294, filed Sep. 20, 2018.
Chetlur et al., "cuDNN: Efficient Primitives for Deep Learning", NVIDIA, Santa Clara, CA, arXiv:1410.0759v3 [cs.NE], pp. 1-9, Dec. 18, 2014.
Suda et al., "Throughput-Optimized OpenCL-based FPGA Accelerator for Large-Scale Convolutional Neural Networks", FPGA '16 Proceedings of the 2016 ACM/SIGDA International Symposium on Field-Programmable Gate Arrays, pp. 16-25, Feb. 21-23, 2016.
Abuzaid et al., "Caffe con Troll: Shallow Ideas to Speed Up Deep Learning", DanaC'15 Proceedings of the Fourth Workshop on Data analytics in the Cloud, Article No. 2, 6 pages, May 31-Jun. 4, 2015.
Kang et al., "A Systematic Approach to Blocking Convolutional Neural Networks",Stanford University, arXiv:1606.04209v1 [cs.DC], pp. 1-12, Jun. 14, 2016.
Shalev et al., U.S. Appl. No. 16/150,299, filed Oct. 3, 2018.
Lim et al., "Multidimensional systolic arrays for the implementation of discrete Fourier transforms", IEEE Transactions on Signal Processing, vol. 47, issue 5, pp. 1359-1370, May 1999.
Mellott et al., "The Gauss machine: A Galois-enhanced quadratic residue number system systolic array", Proceedings of IEEE 11th Symposium on Computer Arithmetic, pp. 156-162, Jun. 1993.
Scheiman et al., "A processor-time-minimal schedule for the standard tensor product algorithm", IEEE computer Society, pp. 176-187, year 1994.
U.S. Appl. No. 16/136,294 office action dated Mar. 3, 2020.
Keller, "Computational Foundation of Cognitive Science—Lecture 15: Convolutions and Kernels", School of Informatics, University of Edinburgh, pp. 1-21, Feb. 23, 2010 downloaded from http://www.inf.ed.ac.uk/teaching/courses/cfcs1/lectures/cfcs_15.pdf.
Wikipedia, "Outer Product", pp. 1-6, May 28, 2020 downloaded from https://en.wikipedia.org/w/index.php?title=Outer_product&oldid=959358295.
Wikipedia, "Matrix Multiplication", pp. 1-14, Jun. 2, 2020 downloaded from https://en.wikipedia.org/w/index.php?title=Matrix_multiplication&oldid=96041746.
U.S. Appl. No. 16/186,620 Office Action dated Jul. 22, 2020.
U.S. Appl. No. 15/700,213 Office Action dated Jun. 25, 2020.

\* cited by examiner

TENSOR-BASED MEMORY ACCESS

CROSS-REFERENCE TO RELATED APPLICATIONS

This application claims the benefit of U.S. Provisional Patent Application 62/582,990, filed Nov. 8, 2017, whose disclosure is incorporated herein by reference.

FIELD OF THE INVENTION

The present invention relates generally to processor architectures, and particularly to tensor-based memory access in a processor.

BACKGROUND OF THE INVENTION

Vector processing is a common operation for many applications such as deep learning. Vector Processors may read some or all input data from memory, and, likewise, may store output data in memory. Consequently, vector processing may involve accessing memory for input and/or output.

U.S. Pat. No. 7,543,119, for example, describes a vector processing system using a System-On-a-Chip (SOC) implementation technique. One or more scalar processors (or cores) operate in conjunction with a vector processor, and the processors collectively share access to a plurality of memory interfaces coupled to Dynamic Random Access read/write Memories (DRAMs).

As another example, U.S. Pat. No. 9,262,165 describes a vector processor including an instruction fetching unit configured to acquire an instruction, a decoding/issuing unit configured to decode the instruction and issuing the instruction, an operation group configured to include a plurality of operation units, and a register configured to store the element data column.

SUMMARY OF THE INVENTION

An embodiment of the present invention that is described herein provides a processor including an internal memory and a processing circuitry. The internal memory is configured to store a definition of a multi-dimensional array stored in an external memory and indices that specify elements of the multi-dimensional array in terms of multi-dimensional coordinates of the elements within the array. The processing circuitry is configured to execute instructions in accordance with an Instruction Set Architecture (ISA) defined for the processor. At least some of the instructions in the ISA access the multi-dimensional array by operating on the multi-dimensional coordinates specified in the indices.

In an embodiment, in accordance with the ISA, the processing circuitry is configured to execute at least one instruction that translates between the multi-dimensional coordinates of an element of the array and an address in which the element is stored in the external memory.

In yet other embodiments, in accordance with the ISA, the processing circuitry is configured to execute an instruction that accesses an element of the array based on the multi-dimensional coordinates of the element.

In alternative embodiments, in accordance with the ISA, the processing circuitry is configured to execute an instruction that performs a mathematical operation between sets of multi-dimensional coordinates. In an embodiment, the instructions sum corresponding coordinates of two sets.

In some embodiments, in accordance with the ISA, the processing circuitry is configured to execute an instruction that performs a permutation among the multi-coordinates of an element of the array. In other embodiments, the processing circuitry is configured to identify that an executed tensor-access instruction exceeds a bound of the multi-dimensional array. In an embodiment, the processing circuitry is configured to return a padding value as a result of the tensor-access instruction in response to identifying that the tensor-access instruction exceeds the bound.

There is additionally provided, in accordance with an embodiment of the present invention, a method including storing in an internal memory of a processor a definition of a multi-dimensional array stored in an external memory, and indices that specify elements of the multi-dimensional array in terms of multi-dimensional coordinates of the elements within the array. Using processing circuitry of the processor, instructions are executed in accordance with an Instruction Set Architecture (ISA) defined for the processor. At least some of the instructions in the ISA access the multi-dimensional array by operating on the multi-dimensional coordinates specified in the indices.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and apparatus for processing multi-dimensional arrays in processors. Multi-dimensional arrays are also referred to as tensors, and both terms are used interchangeably herein. Tensors may comprise, for example, two-dimensional arrays such as digital images, as well as data structures having more than two dimensions.

In the disclosed embodiments, a processor stores one or more multi-dimensional arrays in an external memory. The processor supports an Instruction Set Architecture (ISA), which specifies various tensor-access instructions. The tensor-access instructions manipulate elements of multi-dimensional arrays by operating directly on the multi-dimensional coordinate values of the elements (as opposed to operating on the addresses in which the elements are stored in the external memory). In this manner, the processor manipulates tensor elements by dedicated hardware, achieving higher speed than software-based solutions.

In some embodiments, the processor stores in its internal memory a definition of each array that specifies, for example, the number of dimensions of the tensor, and the address of the first tensor element in external memory. The processor further stores in an internal memory indices that specify elements of the multi-dimensional arrays in terms of multi-dimensional coordinates of the elements. The tensor-access instructions operate on the indices. Example tensor-access instructions, which will be described in detail below, include instructions that calculate the address in the external memory of a tensor element, and instructions that convert an address in the external memory to tensor coordinates.

In some example embodiments of the present invention, the number of dimensions is limited to five; in other embodiments the number of dimensions may be limited to any other number; and in yet other embodiments the number of dimensions may not be limited.

According to embodiments, a vector processor may comprise a Scalar Register File (SRF), and an Index Register File (IRF). The IRF comprises multiple entries, each having a number of fields equal to the number of tensor dimensions (DIMS) supported by the processor (e.g., if the processor supports 5-dimensional tensors, the number of fields is five, numbered DIM4, DIMS, DIM2, DIM1 and DIM0).

According to an embodiment, each field of an IRF entry holds the index of the tensor element in the relevant dimension that will be used by a load or store operation. For example, a 5-field IRF entry of {2, 3, 5, 7, 16} points to an element with coordinates (2, 3, 5, 7, 16) in a 5-dimensional tensor space. In an embodiment, the lowest field (DIM0) is the fastest-changing dimension (with reference to tensor processing order), while the highest field (DIM4) is the slowest-changing dimension. For example, for a 2-dimension tensor (a 2D array, e.g., an image), the x axis (DIM0) may be the fastest-changing dimension and y axis (DIM1) the slowest-changing dimension.

In some embodiments of the present invention, the dimensions can be swapped (as will be described hereinbelow). In this case, a faster-changing dimension can become slower, and a slower-changing dimension can become faster.

According to some embodiments of the present invention, the vector processor further comprises a Tensor Descriptor Memory (TDM), which stores tensor information (for example tensor base address, padding value, dimension offsets, strides and sizes).

The vector processor engine processes a vector that comprises a preset number of elements (the number of elements will be referred to hereinunder as processor granularity). According to an embodiment of the present invention, elements of the vector correspond to elements of a tensor that share the same n−1 dimensions indexes (wherein n is the number of the dimensions of the tensor; referred to hereinunder as Tensor Dimensionality). For example, a 1024×1024×1024 cube can be represented by a tensor of dimensionality=3, with sizes 1024 in each of the three dimensions. A vector processor with granularity=256, reads or writes 256 elements of the cube; for example, elements {19,205,1}, {19,205,2} . . . {19,205,256}.

According to embodiments, the vector processor further comprises a special ALU that supports a dedicated Instruction Set Architecture (ISA), which comprises instructions that manipulate the Index register file. The ALU is configured to execute the dedicated ISA instructions, i.e. execute instructions that manipulate the IRF. Such instructions read inputs from the IRF or from the SRF, and store execution results in the IRF or SRF. According to an embodiment, the instructions comprise, for example, converting a multi-dimensional IRF entry to a scalar or from a scalar to a multi-dimensional IRF entry, permuting coordinates of a tensor entry in the IRF, performing mathematical operations between IRF entries, and others (the full instruction set of an example embodiment of the present invention will be described hereinbelow).

According to some embodiments of the present invention, tensor access instructions may sometimes access memory locations that are not part of the tensors (Out Of Bound accesses). For example, when the value of a pixel is calculated from value of neighbor pixels, and the pixel is at or near the tensor boundary (and, hence, some of the pixel's neighbors are missing). In embodiments, tensor read instructions that access out-of-bound location return a predefined padding value; and tensor write instructions to out-of-bound locations are skipped.

Thus, in embodiments according to the present invention, tensor access, including out-of-bound handling, is done by hardware (typically transparently to the programmer), at a higher speed.

System Description

Figure 1:
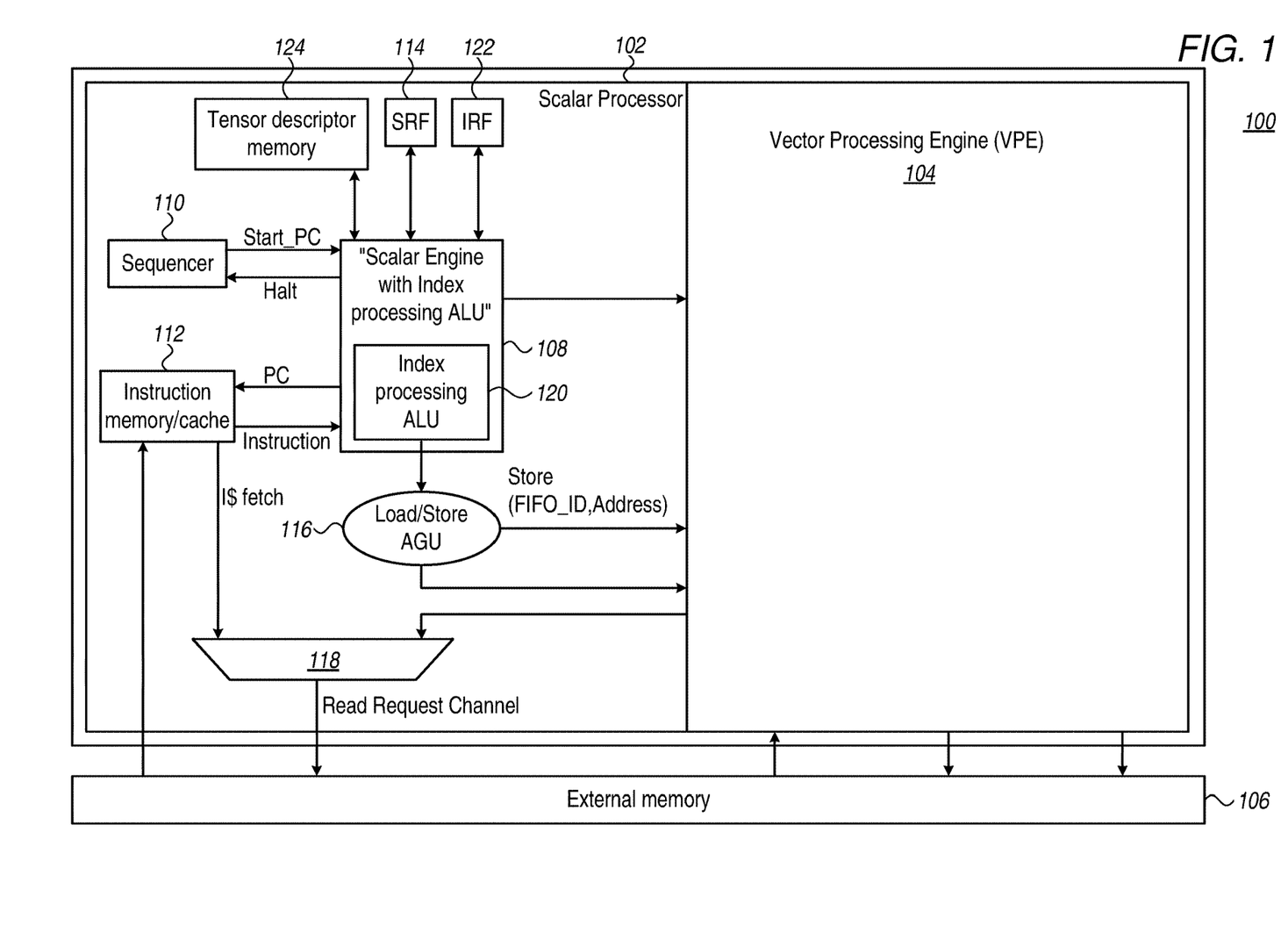
FIG. 1 is a block diagram that schematically illustrates the architecture of a processor, in accordance with embodiments of the present invention.

FIG. 1 is a block diagram that schematically describes the architecture of a processor 100 according to embodiments of the present invention. The processor comprises a scalar processor 102, a vector processor engine (VPE) 104, and an external memory 106. Vector Processor 104 processes vectors, as described, for example, in U.S. patent application Ser. No. 16/150,299, filed Oct. 3, 2018, which is assigned to the assignee of the present patent application and whose disclosure is incorporated herein by reference.

Scalar Processor 102 comprises a Scalar Engine 108, which is configured to decode and execute instructions; a Sequencer 110, which is configured to govern the operation of Scalar Engine 108 (using start-PC, Halt and other control signals); An Instruction Cache 112, which is configured to prefetch instructions; a Load-Store Address Generation Unit (AGU) 116, which is configured to generate the addresses and the tags of the vector-processor data; a scalar register file 114; a Multiplexer 118, which is configured to initiate memory access requests, through a read-request channel, in response to requests from Instruction Cache 112 and from AGU 116; an Index Register File (IRF) 122, which is configured to store n-dimensional indexes of tensors of n dimensions and, a Tensor Descriptor Memory (TDM) 124, which is configured to store tensor information (tensor base address, padding value, dimension offsets, strides, sizes, etc.), for a predefined number of tensors that is supported by the processor.

According to an embodiment of the present invention, Scalar Engine 108 comprises an Index Processing ALU 120, which is configured to support dedicated ISA instructions that allow manipulation of IRF 122.

Thus, according to the embodiment described in FIG. 1, Vector Processor 100 is configured to store and manipulate data that pertains to tensors that the vector processor processes.

The configuration of vector processor 100 is an example configuration that is depicted purely for the sake of conceptual clarity. Other suitable configurations may be used in alternative embodiments of the present invention. For example, sequencer 110 may use other signals to govern the operation of scalar engine 108, there could be more than one vector-processor-engine 104, memory 106 may comprise two or more separately accessible memories (e.g., one for instructions and one for data).

In the present context, the various elements of processor 100 that carry out the disclosed techniques, e.g., scalar engine 108, ALU 120, sequencer 110, AGU 116, multiplexer 118 and VPE 104, are referred to collectively as the "processing circuitry" of the processor. Similarly, SRF 114, IRF 122, TDM 124 and cache 112 are referred to collectively as the "internal memory" of the processor. In alternative embodiments, the processing circuitry and/or internal memory may have any other suitable structure.

In some embodiments, scalar engine 108 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

According to embodiments of the present invention, IRF 122 comprises n-field entries, where n is the number of dimensions that the vector processor supports (e.g. 5).

Each field holds the index of a tensor element in the relevant dimension that will be used by a load or store operations that the vector processor will execute. For example, the 5-field index {2, 3, 5, 7, 16} may point to an element with coordinates (2, 3, 5, 7, 16) in a 5-dimensional tensor space.

According to an embodiment, when the vector processor processes a tensor, the lowest field of an IRF entry (DIM0) is the fastest-changing dimension, whereas the highest field (e.g. DIM4) is the slowest-changing dimension. For example, for a 2-dimension tensor (2D image), the x axis (DIM0) may be the fastest-changing dimension, and the y axis (DIM1) the slowest-changing dimension. According to embodiments of the present invention, the dimensions can be swapped (as will be described hereinbelow). In this case, a faster-changing dimension can become slower, and a slower-changing dimension can become faster. For example, if a 2-dimensional tensor (2D image) is processed in a horizontal raster, then the x axis is the fast-changing dimension and the y axis is the slow-changing dimension. If the 2D image is processed in a vertical raster, then the y axis is the fast-changing dimension and the x axis is the slow-changing dimension.

Figure 2:
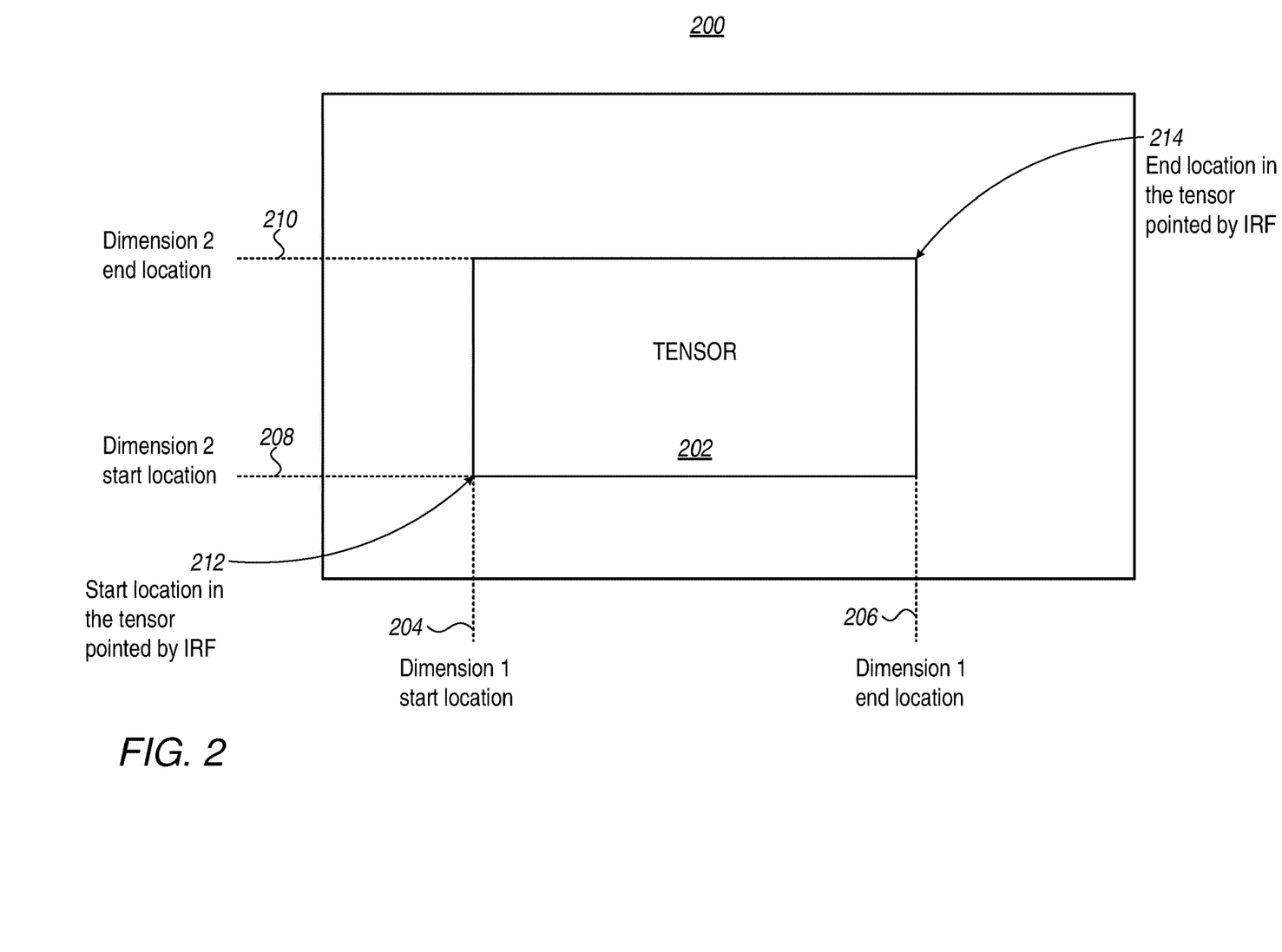
FIG. 2 is an illustration that schematically illustrates an example of a 2D tensor and Index Reference File (IRF) entries that point to locations in the tensor, in accordance with embodiments of the present invention.

FIG. 2 is an illustration 200 that schematically describes an example of a 2D tensor 202 and Index Reference File (IRF) entries that point to locations in the tensor, in accordance to embodiments of the present invention.

Tensor 202 has a first dimension and a second dimension (horizontal and vertical axes, respectively, in the example illustration of FIG. 2). The Tensor has a start-dimension-1 location 204, an end-dimension-1 location 206, a start-dimension-2 location 208, and an end-dimension-2 location 210. According to an embodiment, IRF 122 (FIG. 1) comprises an entry 212, and an entry 214, which point to the start and end locations, respectively, in both dimensions.

Figure 3:
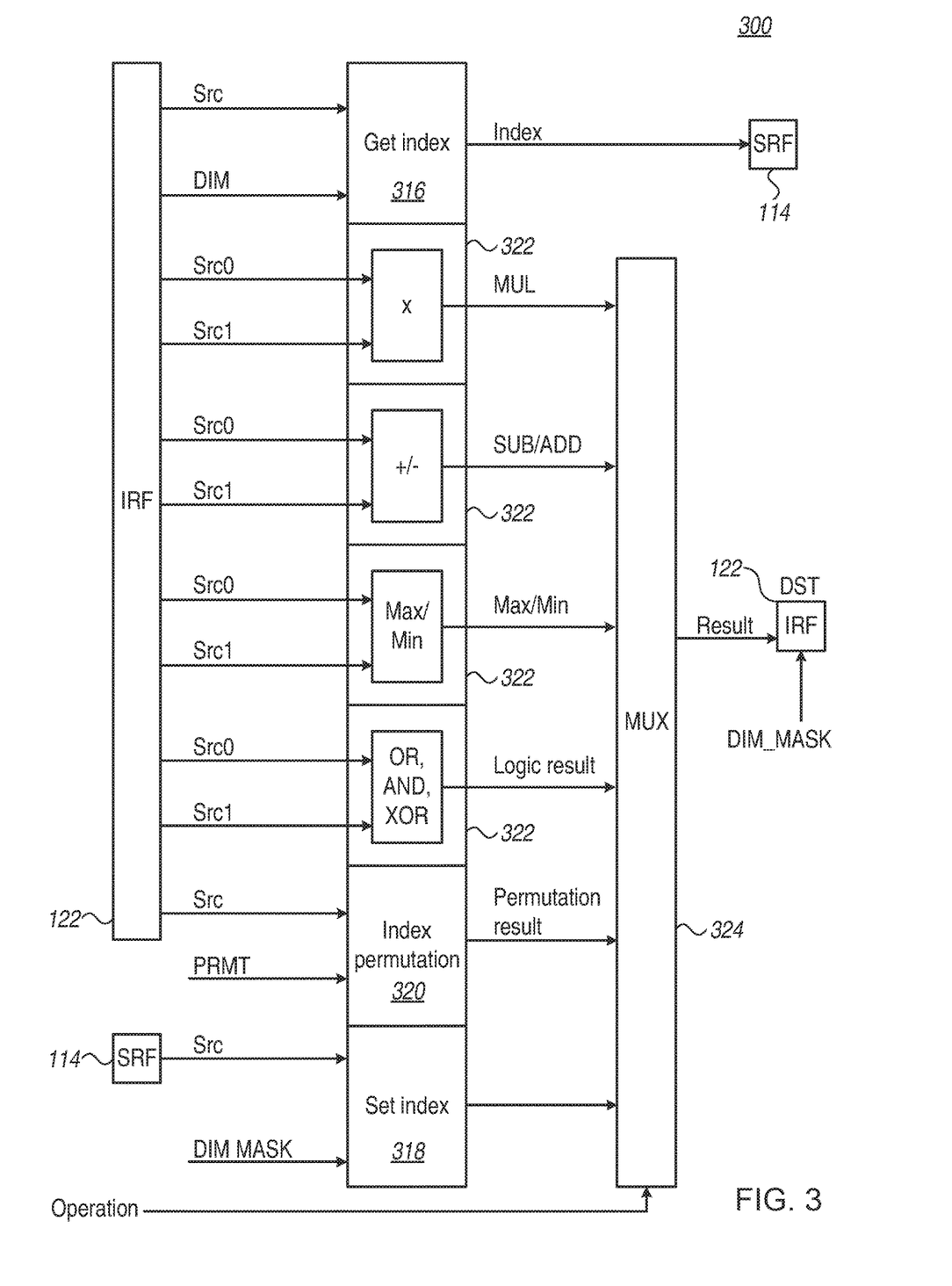
FIG. 3 is a block diagram that schematically illustrates an ALU that implements dedicated instructions for manipulation and processing of tensor indexes, in accordance with embodiments of the present invention.

The illustration of tensor 202 is an example that is depicted purely for the sake of conceptual clarity. In embodiments of the present invention, tensors typically have more than two dimensions. While the expansion of the example to more dimensions is trivial, illustration of examples with three dimensions is more complex, and illustrations with four or more dimensions may be illegible. FIG. 3 is a block diagram that schematically describes index-processing ALU 120 (FIG. 1), according to some embodiments of the present invention. The ALU reads input sources from IRF 122 or from SRF 114, and stores execution results into the IRF or the SRF. The ALU comprises logic units that execute dedicated ISA instructions:

A Get Index Unit 316, which takes tensor indexes from IRF 122 as the source, selects index based on a DIM field of the instruction, and stores the index into SRF 114 as destination; A Set Index Unit 318, which takes scalar value from SRF 114 as the source and stores the value into IRF 122 as destination, using destination indexes, according to a DIM_MASK field of the instruction (as defined below);

An Index Permutation Unit 320, which takes tensor indexes from IRF 122 as the source, performs permutation between coordinates and indexes to switch between tensor dimensions (as described below), and stores updated indexes into IRF 122 as the destination;

An Arithmetic Unit 322, which further comprises circuits for the execution of Multiply ("X"), SUB/ADD ("+/−"), Max/Min, and OR/AND/XOR operations; and a MUX 324, which selects an output that the index-processing ALU writes into IRF 122.

Set Index Unit 318 is configured to execute SET INDEX (DST, DIM_MASK, SRC) instructions, which initialize an entry in the index register file with element coordinates. The DST field defines which entry in the IRF will be initialized; the DIM_MASK field specifies which indexes (coordinates) are initialized; and, the SRC field defines an initialization value, which can be an immediate value, or a value that is read from a Scalar Register File 114 (FIG. 1).

Index Permutation Unit 320 is configured to execute PRMT_INDX (DST, PRMT, SRC) instructions, which perform permutation between indexes (coordinates) to switch between tensor dimensions (for example, making a slow changing dimension faster). The DST field defines the destination entry in the IRF after dimensions permutation, and the SRC field defines the source entry in the IRF for dimensions permutation. The PRMT field comprises one bit for every dimension of the tensor and specifies how dimensions are permuted. For example, for a 5-dimensional tensor:

IRF[DST][DIM0]=IRF[Src][PRMT[0]]
IRF[DST][DIM1]=IRF[Src][PRMT[1]]
IRF[DST][DIM2]=IRF[Src][PRMT[2]]
IRF[DST][DIM3]=IRF[Src][PRMT[3]]
IRF[DST][DIM4]=IRF[Src][PRMT[4]]

Get Index Unit 316 is configured to execute GET_INDX (DST, DIM_MASK, SRC) instructions, which write an index value in SRF 114. The DST field defines the destination entry in the SRF into which the index will be written; the SRC field defines a source entry in IRF 122 from which the index is read; and the DIM field specifies which dimension indexes to get.

Arithmetic Unit 322 is configured to execute arithmetic (and logic) instructions on tensor indexes. The arithmetic Unit performs operations between two sets of tensor indexes (sources), that are stored in IRF 122; and, to store the results of the operations into IRF 122 (destination). The operations are done simultaneously for any of the pairs of indexes of the two tensor sources, as indicated by a DIM_MASK parameter of the instruction. According to embodiments of the present invention, the DIM_MASK parameter comprises one bit for each dimension (for example, five bits for 5-D tensors). The arithmetic operation will be done on the dimensions for which the corresponding bit in the DIM_MASK field is set. For example, for an ADD operation:

IRF [DST] [DIM0] = IRF [Src0] [DIM0] + IRF [Src1] [DIM0] if DIM_MASK [0] = 1;
IRF [DST] [DIM1] = IRF [Src0] [DIM1] + IRF [Src1] [DIM1] if DIM_MASK [1] = 1;
IRF [DST] [DIM2] = IRF [Src0] [DIM2] + IRF [Src1] [DIM2] if DIM_MASK [2] = 1;

```
IRF [DST] [DIM3] = IRF [Src0] [DIM3] + IRF [Src1] [DIM3] if
DIM_MASK [3] = 1;
IRF [DST] [DIM4] = IRF [Src0] [DIM4] + IRF [Src1] [DIM4] if
DIM_MASK [4] = 1;
```

If DIM_MASK[x]=0, IRF[DST][DIMx] is not updated in IRF.

According to the example embodiment of FIG. 3, the mathematical instructions that ALU 300 supports comprise the following:
   MUL (DST, DIM_MASK, SRC0, SRC1);
   ADD (DST, DIM_MASK, SRC0, SRC1);
   SUB (DST, DIM_MASK, SRC0, SRC1);
   MAX (DST, DIM_MASK, SRC0, SRC1);
   MIN (DST, DIM_MASK, SRC0, SRC1);
   OR (DST, DIM_MASK, SRC0, SRC1);
   AND (DST, DIM_MASK, SRC0, SRC1); and
   XOR (DST, DIM_MASK, SRC0, SRC1).

The DST field defines the destination entry in IRF 122; SRC0/SRC1 fields define the source entries in IRF 122; and the DIM_MASK field specifies what indexes (coordinates) participate in the operation.

The ISA instructions that index processing ALU 120 is configured to execute, are examples that are depicted purely for the sake of conceptual clarity. Other suitable ISA instructions may be added, and some ISA instructions may be removed; for example, an instruction that calculate the intersection tensor of two tensors may be added.

The structure of index-processing ALU 120, as presented in block diagram 300 of FIG. 3, is an example that is depicted purely for the sake of conceptual clarity. Different structures could be used in alternative embodiments; for example, arithmetic-logic units 322 may be replaced by a single unit with a configurable ALU.

Tensor-Access Instructions

According to embodiments of the present invention, vector processor 100 is further configured to execute ISA Tensor Access instructions, which access tensors in external memory 106, using IRF 122 indexes. The tensor addresses of the Tensor Access ISA instructions are calculated by AGU 116. In some embodiments, Tensor Access ISA instructions comprise an Address Generation instruction (GEN_ADDR), a Load Tensor (LD_TNSR) instruction, and a Store Tensor (ST_TNSR) instruction.

The Address Generation instruction generates memory addresses (in external memory 106) for tensor load/store operation. The ISA definition of the Address Generation instruction is:
ADDR=GEN_ADDR (IRF_SRC, Tensor ID). Tensor ID is the tensor number (in TDM 124); IRF_SRC represents the coordinates in the tensor to be accessed in the tensor load/store operations; and, ADDR is the start memory address for the tensor load/store operations.

The Load Tensor instruction loads tensor elements from external memory. The ISA definition of the Load Tensor instruction is: V_DST=LD_TNSR (IRF_SRC, Tensor ID). V_DST is the destination entry in VPE 104, Tensor ID is the tensor number (in TDM 124), and IRF_SRC represents the coordinates of an element of the tensor. The tensor base address, padding value, dimension offsets, strides, and sizes are extracted from the tensor descriptor in TDM 124 that is indicated by the Tensor ID.

The Store Tensor instruction stores a tensor in external memory 106. The ISA definition of the Store Tensor instruction is: ST_TNSR (IRF_SRC, Tensor ID, V SRC). V SRC is source entry in VPE 104, Tensor ID is tensor number for storing, and IRF_SRC represents the coordinates in the tensor where data will be stored. The tensor base address, padding value and dimension offsets, strides, and sizes are extracted from the tensor descriptor in TDM 124 that is indicated by the Tensor ID.

The tensor access instructions described above are example instructions, which are chosen purely for the sake of conceptual clarity. In alternative embodiments, the ISA of vector processor 100 may support any other suitable instructions that access or otherwise manipulate tensors or tensor elements.

Out-of-Bounds Memory Access Support Mechanism

In practice, tensor accessing instructions may result in an out-of-bound tensor access—i.e.—may access memory locations that are beyond the addresses allocated for the tensor. Out-of-bound tensor accesses may occur, for example, when a value of a pixel is calculated as a function of the values of neighbor pixels (e.g. a 5×5 low-pass kernel in a 2-D image). When the first or the last pixels in any dimension are calculated, some of the neighbor pixels extend beyond the tensor dimensions; as a result, the vector processor executes an out-of-bound access.

Figure 4:
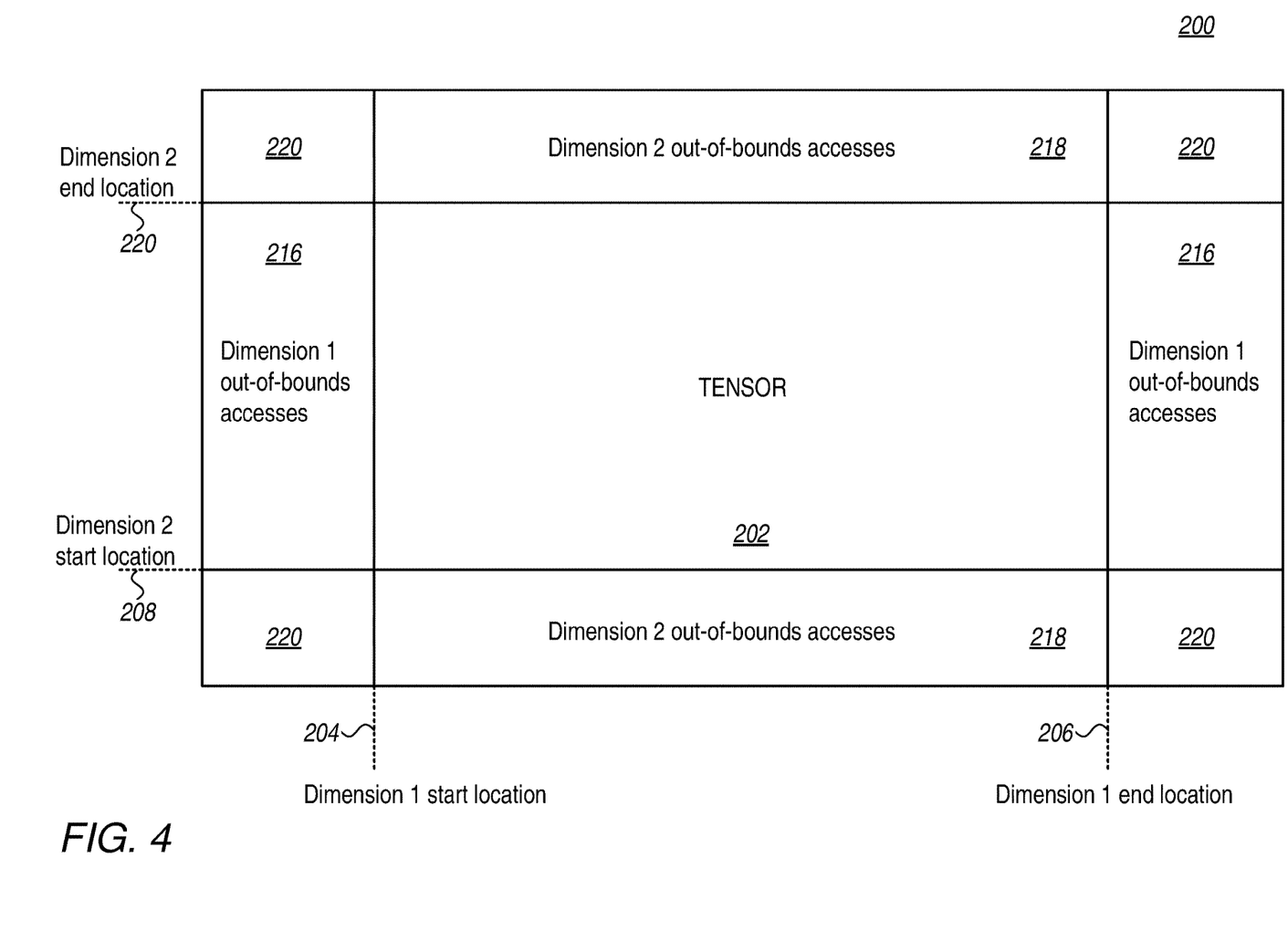
FIG. 4 is an illustration that schematically illustrates an example out-of-bounds tensor accesses, in accordance with embodiments of the present invention.

FIG. 4 is an illustration that schematically describes an example out-of-bounds tensor accesses, in accordance with an embodiment of the present invention. Rectangles in 2-D space 200 represent x-y memory access zones: A zone 202 represents accesses to the tensor (not out of bound). Zones 216 represent tensor accesses wherein dimension 1 index is less than dimension-1 start location 204, or more than dimension-1 end location 206. Zones 218 represent tensor accesses wherein dimension-2 index is less than dimension-2 start location 208, or more than dimension-2 end location 210. Zones 220 represent tensor accesses wherein both dimensions are out-of-bound.

According to embodiments of the present invention, the AGU detects reading from an out-of-bound zone; such reading will return a pre-defined padding value (as will be described hereinbelow).

The example of FIG. 4 describes out-of-bound accesses of a two-dimensional tensor. In other embodiments of the present invention, the tensor may have more than two dimensions, and accesses may be out-of-bound in any dimension, or in a plurality of dimensions.

In the foregoing, we describe how vector processor 102 handles out of bound tensor accesses, according to some embodiments of the present invention. The addresses for the accesses are calculated by AGU 116 (FIG. 1).

Load Tensor

According to an embodiment, when the vector processor executes an LD_TNSR instruction, and one or more tensor dimensions in the IRF_SRC field are out of bounds, the vector processor will get a padding value for the locations which are out-of-bound. The tensor descriptor defines tensor size in each dimension. When AGU 116 executes a LD_TNSR instruction, the AGU compares indexes of valid dimensions from IRF_SRC to dimension sizes to identify what dimensions are out of bound.

For the fastest changing dimension (DIM0), out-of-bound padding can be on any part of the vector up to the granularity of the vector engine processing size. For example, if the vector processing size (vector granularity) is N pixels, for a 2-dimensional tensor (2D image) of size Width×Height, the AGU pads pixels up to a granularity of N pixels for the horizontal dimension X (fastest changing dimension) and up to Width pixels for the vertical dimension Y.

Store tensor According to some embodiments, when the vector processor executes a ST_TNSR instruction, and one or more tensor dimensions in the IRF_SRC field are out of bounds, AGU 116 does not write data to out-of-bounds addresses, and only the valid elements in the tensor are written to memory. During ST_TNSR instruction execution by the Load/Store AGU, indexes of valid dimensions from IRF_SRC are compared to dimension sizes to identify what dimensions are out of bound.

For the fastest-changing dimension (DIM0) out-of-bound addresses can be on part of the vector up to the granularity of the vector engine processing size. For example, if the vector processing size is N pixels, for a 2-dimensional tensor (2D image) of size Width×Height, out-of-bound addresses can be up to a granularity of N pixels for the horizontal dimension X (fastest changing dimension) and up to Width pixels for the vertical dimension Y.

GEN_ADDR

When a GEN_ADDR instruction is issued, and the address generated is out of bounds, the address returned to the address register file is the tensor base address.

The configurations of Vector Processor 100, Index Processing ALU 300 and index manipulating ISA instructions, which are described hereinabove, are example configurations that are shown purely for the sake of conceptual clarity. Any other suitable configurations can be used in alternative embodiments. The different elements of Vector Processor 100 and index processing ALU 300 may be implemented using suitable hardware, such as in one or more Application-Specific Integrated Circuits (ASICs) or Field-Programmable Gate Arrays (FPGAs), using software, using hardware, or using a combination of hardware and software elements.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
an internal memory, configured to store at least one definition of a multi-dimensional array stored in an external memory;
processing circuitry implementing a scalar engine, configured to execute instructions in accordance with an Instruction Set Architecture (ISA) defined for the processor, wherein at least some of the instructions in the ISA indicate an address of a single element in the multi-dimensional array, by an ID of the multi-dimensional array and an indication of a plurality of coordinates corresponding respectively to different dimensions of the multi-dimensional array; and
a load-store address generation unit configured to calculate a memory address corresponding to multi-dimensional coordinates of a single element indicated by an instruction executed by the processing circuitry, using a base address and dimension sizes of the multi-dimensional array from the at least one definition of the multi-dimensional array indicated by the ID and the plurality of coordinates indicated by the instruction.

2. The processor according to claim 1, wherein, in accordance with the ISA, the processing circuitry is configured to execute at least one instruction that translates between an input of multi-dimensional coordinates of an element of the array to provide as a result of the at least one instruction, an address in which the element is stored in the external memory.

3. The processor according to claim 1, wherein, in accordance with the ISA, the processing circuitry is configured to execute an instruction that accesses an element of the array based on the multi-dimensional coordinates of the element.

4. The processor according to claim 1, wherein the internal memory is further configured to store vectors of indices that specify elements of the multi-dimensional array in terms of multi-dimensional coordinates of the elements within the array, wherein the at least some of the instructions indicate the plurality of coordinates by referring to one of the vectors of indices in the internal memory and wherein the load-store address generation unit extracts the plurality of coordinates from the one of the vectors of indices in the internal memory indicated by the reference in the instruction.

5. The processor according to claim 4, wherein, in accordance with the ISA, the processing circuitry is configured to execute an instruction that performs a mathematical operation between vectors of indices in the internal memory.

6. The processor according to claim 5, wherein the processing circuitry is configured to execute an instruction that sums corresponding coordinates of two vectors of indices.

7. The processor according to claim 4, wherein, in accordance with the ISA, the processing circuitry is configured to execute an instruction that performs a permutation among the coordinates of one of the vectors of indices.

8. The processor according to claim 1, wherein the load-store address generation unit is configured to compare the plurality of coordinates indicated by the instruction to dimension sizes of the multi-dimensional array, to identify when multi-dimensional coordinates in an executed tensor-access instruction exceed a bound of the multi-dimensional array.

9. The processor according to claim 8, wherein, in response to identifying that the multi-dimensional coordinates in the tensor-access instruction exceed the bound, the load-store address generation unit is configured to return a padding value as a result of the tensor-access instruction.

10. The processor according to claim 1, wherein the load-store address generation unit comprises dedicated hardware.

11. The processor according to claim 1, wherein the load-store address generation unit is configured to extract the base address from the internal memory using the ID indicated by the instruction.

12. The processor according to claim 1, wherein the load-store address generation unit is configured to extract strides of the multi-dimensional array from the internal memory using the ID indicated by the instruction, and to calculate the memory address using the extracted strides.

13. The processor according to claim 1, wherein the load-store address generation unit is configured to extract dimension offsets of the multi-dimensional array from the internal memory using the ID indicated by the instruction, and to calculate the memory address using the extracted dimension offsets.

14. The processor according to claim 1, wherein the multi-dimensional array has more than two dimensions and wherein the plurality of coordinates include a coordinate for each of the dimensions.

15. A method, comprising:
  storing in an internal memory of a processor at least one definition of a multi-dimensional array stored in an external memory; and
  using processing circuitry of the processor, executing instructions in accordance with an Instruction Set Architecture (ISA) defined for the processor, wherein at least some of the instructions in the ISA indicate an address of a single element in the multi-dimensional array by an ID of the multi-dimensional array and an indication of a plurality of coordinates corresponding respectively to different dimensions of the multi-dimensional array; and
  calculating a memory address corresponding to multi-dimensional coordinates of a single element indicated by an instruction executed by the processing circuitry, using a base address and dimension sizes of the multi-dimensional array from the at least one definition of the multi-dimensional array indicated by the ID and the plurality of coordinates indicated by the instruction, by a load-store address generation unit of the processor.

16. The method according to claim 15, wherein, in accordance with the ISA, executing the instructions comprises executing at least one instruction that translates between an input of multi-dimensional coordinates of an element of the array and provides as a result of the at least one instruction, an address in which the element is stored in the external memory.

17. The method according to claim 15, wherein, in accordance with the ISA, executing the instructions comprises executing an instruction that accesses an element of the array, based on the multi-dimensional coordinates of the element.

18. The method according to claim 15, wherein, in accordance with the ISA, executing the instructions comprises executing an instruction that performs a mathematical operation between sets of multi-dimensional coordinates.

19. The method according to claim 18, wherein, in accordance with the ISA, executing the instructions comprises executing an instruction that sums corresponding coordinates of two sets.

20. The method according to claim 15, wherein, in accordance with the ISA, executing the instructions comprises executing an instruction that performs a permutation among the multi-coordinates of an element of the array.

21. The method according to claim 15, wherein executing the instructions comprises comparing the plurality of coordinates indicated by the instruction to dimension sizes of the multi-dimensional array, to identify when multi-dimensional coordinates in an executed tensor-access instruction exceed a bound of the multi-dimensional array.

22. The method according to claim 21, wherein executing the instructions comprises, in response to identifying that the multi-dimensional coordinates in an executed tensor-access instruction exceed a bound of the multi-dimensional array, returning a padding value by the load-store address generation unit.

* * * * *